(12) United States Patent
Anderson (10) Patent No.: US 6,438,750 B1
(45) Date of Patent: Aug. 20, 2002

(54) DETERMINING LOADING TIME OF AN OPERATING SYSTEM

(75) Inventor: Eric C. Anderson, Sunnyvale, CA (US)

(73) Assignee: Phoenix Technologies Ltd., San Jose, CA (US)

( * ) Notice: Subject to any disclaimer, the term of this patent is extended or adjusted under 35 U.S.C. 154(b) by 0 days.

(21) Appl. No.: 09/336,337

(22) Filed: Jun. 18, 1999

(51) Int. Cl.[7] .............................................. G06F 9/445
(52) U.S. Cl. ...................... 717/178; 717/173; 717/174; 713/1; 713/2
(58) Field of Search ................................ 717/4, 11, 173, 717/174, 178; 713/1, 2; 345/633, 814, 844

(56) References Cited

U.S. PATENT DOCUMENTS

| | | |
|---|---|---|
| 5,121,345 A | 6/1992 | Lentz |
| 5,128,995 A | 7/1992 | Arnold et al. |
| 5,131,089 A | 7/1992 | Cole |
| 5,142,680 A * | 8/1992 | Ottman et al. ............... 717/11 |
| 5,146,568 A | 9/1992 | Flaherty et al. |
| 5,214,695 A | 5/1993 | Arnold et al. |
| 5,274,816 A | 12/1993 | Oka |
| 5,280,627 A | 1/1994 | Flaherty et al. |
| 5,307,497 A | 4/1994 | Freigenbaum et al. |
| 5,325,532 A | 6/1994 | Crosswy et al. |
| 5,355,498 A * | 10/1994 | Provino et al. .............. 709/320 |
| 5,379,431 A | 1/1995 | Lemon et al. |
| 5,381,549 A | 1/1995 | Tamura |
| 5,418,918 A | 5/1995 | Vander Kamp et al. |
| 5,444,850 A | 8/1995 | Chang |
| 5,448,741 A | 9/1995 | Oka |
| 5,452,454 A | 9/1995 | Basu |
| 5,463,766 A | 10/1995 | Schieve et al. |
| 5,469,573 A | 11/1995 | McGill, III et al. |
| 5,504,905 A | 4/1996 | Cleary et al. |
| 5,522,076 A | 5/1996 | Dewa et al. |
| 5,526,523 A | 6/1996 | Straub et al. |
| 5,542,082 A | 7/1996 | Solhjell |
| 5,581,740 A | 12/1996 | Jones |
| 5,586,327 A | 12/1996 | Bealkowski et al. |
| 5,594,903 A | 1/1997 | Bunnell et al. |
| 5,604,890 A | 2/1997 | Miller |
| 5,652,868 A | 7/1997 | Williams |
| 5,652,886 A | 7/1997 | Tulpule et al. |
| 5,664,194 A | 9/1997 | Paulsen |
| 5,680,547 A | 10/1997 | Chang |
| 5,692,190 A | 11/1997 | Williams |
| 5,694,583 A | 12/1997 | Williams et al. |
| 5,694,600 A | 12/1997 | Khenson et al. |
| 5,701,477 A | 12/1997 | Chejlava, Jr. |
| 5,715,456 A | 2/1998 | Bennett et al. |
| 5,717,930 A | 2/1998 | Imai et al. |
| 5,727,213 A | 3/1998 | Vander Kamp et al. |
| 5,732,268 A | 3/1998 | Bizzarri |
| 5,748,957 A | 5/1998 | Klein |
| 5,754,853 A | 5/1998 | Pearce |
| 5,764,593 A | 6/1998 | Turpin et al. |
| 5,781,758 A | 7/1998 | Morley |
| 5,790,849 A | 8/1998 | Crocker et al. |

(List continued on next page.)

OTHER PUBLICATIONS

Title Mapping Imported Symbols at Link Time to Improve Load Time on the Office System/2 Operating System, IBM Tech Bull Sep. 1995.*

(List continued on next page.)

Primary Examiner—Gregory Morse
Assistant Examiner—Chameli C. Das (57) ABSTRACT

The present invention is a method and apparatus to determine loading time of an operating system in a computer system. A basic input and output system (BIOS) retrieves a first time value from a real-time clock. The BIOS loads the OS into memory of the computer system. The OS has a device driver. The device driver retrieves a second time value from the real-time clock. A time difference is computed based on the first and second time value to obtain the loading time of the OS.

40 Claims, 8 Drawing Sheets

U.S. PATENT DOCUMENTS

| | | |
|---|---|---|
| 5,796,984 A | 8/1998 | Pearce et al. |
| 5,802,363 A | 9/1998 | Williams et al. |
| 5,805,880 A | 9/1998 | Pearce et al. |
| 5,805,882 A | 9/1998 | Cooper et al. |
| 5,815,689 A * | 9/1998 | Shaw et al. ............. 713/400 |
| 5,815,706 A | 9/1998 | Stewart et al. |
| 5,819,063 A | 10/1998 | Dahl et al. |
| 5,828,888 A | 10/1998 | Kozaki et al. |
| 5,832,251 A | 11/1998 | Takahashi |
| 5,842,011 A | 11/1998 | Basu |
| 5,854,905 A | 12/1998 | Garney |
| 5,864,698 A | 1/1999 | Krau et al. |
| 5,887,164 A | 3/1999 | Gupta |
| 5,892,952 A * | 4/1999 | Seko et al. ............. 717/174 |
| 5,901,310 A | 5/1999 | Rahman et al. |
| 5,907,679 A | 5/1999 | Hoang et al. |
| 5,913,058 A * | 6/1999 | Bonola ..................... 713/2 |
| 5,960,206 A * | 9/1999 | Barsness et al. ........... 717/11 |
| 5,968,174 A * | 10/1999 | Hughes ..................... 713/2 |
| 6,049,871 A * | 4/2000 | Silen et al. ............... 713/2 |
| 6,192,471 B1 * | 2/2001 | Pearce et al. .............. 713/2 |
| 6,212,574 B1 * | 4/2001 | OaRourke et al. ......... 709/321 |
| 6,253,320 B1 * | 6/2001 | Sekiguchi et al. ........... 713/2 |
| 6,262,726 B1 * | 7/2001 | Stedman et al. ........... 345/333 |
| 6,282,643 B1 * | 8/2001 | Cromer .................... 713/2 |
| 6,292,890 B1 * | 9/2001 | Crisan ..................... 713/2 |
| 6,327,652 B1 * | 12/2001 | England et al. ............. 713/2 |
| 6,351,850 B1 * | 2/2002 | van Gilluwe et al. ....... 707/203 |
| 6,357,000 B1 * | 3/2002 | Jain ....................... 713/1 |

OTHER PUBLICATIONS

Title: Shortening the Time for Loading a Program, Publication date: Nov. 1995, □□ source: IBM Technical Disclosure Bulletin.*

Title: Mapping Imported Symbols at Link Time to Improve Load Time on the Office □□ Systems/2 Operating System, Publication date: Sep. 1995, US, source: IBM Technical Disclosure Bulletin.*

* cited by examiner

DETERMINING LOADING TIME OF AN OPERATING SYSTEM

BACKGROUND OF THE INVENTION

1. Field of the Invention

The invention relates generally to processor-based systems and more particularly to the loading time of an operating system (OS).

2. Description of Related Art

To execute a program, a processor in a computer system has to access the executable code of the program from memory. When the computer is first powered up, the processor usually executes the Basic Input and Output System (BIOS) program. The BIOS contains the executable code for a boot-up program. It is essentially built-in software containing a set of instructions that control system devices and test memory. Because it is typically stored in a Read-Only Memory (ROM) chip on the motherboard, it is sometimes call a ROM BIOS.

In a typical power up sequence, the processor is activated upon power up and sends a message to activate the BIOS. When executed, the BIOS runs a series of tests, called the POST for Power On Self Test, to make sure the system devices are working correctly. In general, the BIOS initializes system hardware and chipset registers, initializes power management, tests RAM (Random Access Memory), enables the keyboard, tests serial and parallel ports, initializes floppy disk drives and hard disk drive controllers, and displays system summary information. During POST, the BIOS compares the system configuration data obtained from POST with the system information stored on a CMOS (Complementary Metal-Oxide Semiconductor) memory chip located on the motherboard. This CMOS chip, which is updated whenever new system components are added, contains the latest information about system components.

After the POST is complete, the BIOS looks for the boot program responsible for loading the operating system. Usually, the BIOS looks on the floppy disk drive A followed by hard drive C. After being loaded into memory, the boot program then loads the system configuration information, typically contained in the registry in the operating system (OS) environment, and device drivers. Finally, the operating system is loaded, and, default programs in a start up directory or folder are executed.

The BIOS also helps operating systems and application programs manage the hardware by means of a set of routines called BIOS Run-Time Services. Application programs as well as the operating system can call these services to perform hardware-related functions.

The loading time of the operating system and/or programs into the system or main memory is variable and depends on a number of factors. One factor is the processor's speed. Another factor is the type of mass storage that stores the OS or the program to be loaded.

Accordingly, there is a need in the technology to provide a simple and efficient method to determine the loading time of a program or an operating system.

SUMMARY

The present invention is a method and apparatus to determine loading time of an operating system in a computer system. A basic input and output system (BIOS) retrieves a first time value from a real-time clock. The BIOS loads the OS into memory of the computer system. The OS has a device driver. The device driver retrieves a second time value from the real-time clock. A time difference is computed based on the first and second time value to obtain the loading time of the OS.

BRIEF DESCRIPTION OF THE DRAWINGS

The features and advantages of the present invention will become apparent from the following detailed description of the present invention in which.

DESCRIPTION

The present invention is a method and apparatus to determine the loading time of an operating system in a computer system. A BIOS program reads a start time from real time clock before loading the OS into the system memory. Upon loaded into the system memory, the OS invokes a device driver. The device driver reads the end time from the real-time clock and retrieves the start time from the BIOS. The device driver then computes the load time from the start and end times to obtain the loading time. The loading time and an identification of the computer system or the customer are transferred to a storage area or to a remote server.

In the following description, for purposes of explanation, numerous details are set forth in order to provide a thorough understanding of the present invention. However, it will be apparent to one skilled in the art that these specific details are not required in order to practice the present invention. In other instances, well known electrical structures and circuits are shown in block diagram form in order not to obscure the present invention.

Definitions

As discussed herein, a "computer system" is a product including circuitry capable of processing data. The computer system may include, but is not limited to, general purpose computer systems (e.g., server, laptop, desktop, palmtop, personal electronic devices, etc.), personal computers (PCs), hard copy equipment (e.g., printer, plotter, fax machine, etc.), banking equipment (e.g., an automated teller machine), and the like. An infomediary is a web site that provides information on behalf of producers of goods and services, supplying relevant information to businesses about products and/or services offered by suppliers and other businesses. Content refers to application programs, driver programs, utility programs, the payload, etc., and combinations thereof, as well as graphics, informational material (articles, stock quotes, etc.) and the like, either singly or in any combination. "Payload" refers to messages with graphics or informational material (such as, articles, stock quotes, etc.) and may include files or applications. In one embodiment, it is transferred at a predetermined time to the system's mass storage media. In addition, a "communication link" refers to the medium or channel of communication. The communication link may include, but is not limited to, a telephone line, a modem connection, an Internet connection, an Integrated Services Digital Network ("ISDN") connection, an Asynchronous Transfer Mode (ATM) connection, a frame relay connection, an Ethernet connection, a coaxial connection, a fiber optic connection, satellite connections (e.g. Digital Satellite Services, etc.), wireless connections, radio frequency (RF) links, electromagnetic links, two way paging connections, etc., and combinations thereof.

In addition, the loading of an operating system ("OS") refers to the initial placement of the operating system bootstrap loader. In one embodiment, during the OS load, a sector of information is typically loaded from a hard disk into the system memory. Alternatively, the bootstrap loader is loaded from a network into system memory. An OS "boot" refers to the execution of the bootstrap loader. This places the OS in control of the system. Some of the actions performed during the OS boot include system configuration, device detection, loading of drivers and user logins. OS runtime refers to the completion of the boot phase and the beginning of the execution of applications by the OS. In one embodiment, during OS runtime, the OS interacts with the user to execute and/or run applications.

Power On Self Test (POST) refers to the instructions that are executed to configure and test the system hardware prior to loading an OS.

System Overview

A description of an exemplary system, which incorporates embodiments of the present invention, is hereinafter described.

Figure 1:
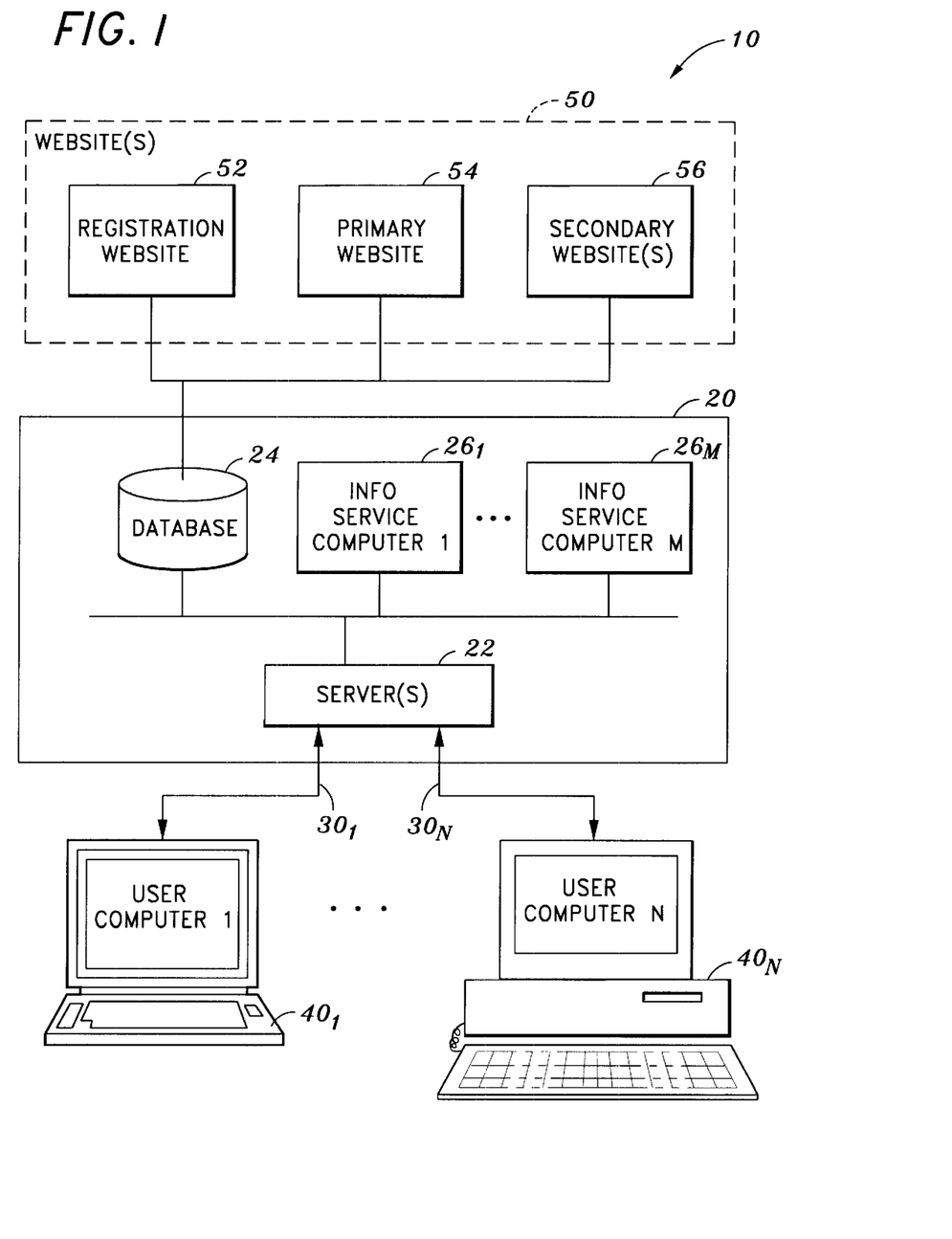
FIG. 1 is a system block diagram of one embodiment of an information distribution system in which the apparatus and method of the invention is used.

FIG. 1 shows a system block diagram of one embodiment of an information distribution system 10 in which the apparatus and method of the invention is used. The system 10 relates to providing an infomediary. It involves the construction and maintenance of a secure and private repository of Internet user and system profiles, collected primarily from warranty service registrations, Internet service registrations, system profiles, and user preferences. Initially, this information is used to register the user with the manufacturers of purchased hardware and software products, and with the providers of on-line or other services. Over time, the user data is used to create a user profile and notify users of relevant software updates and upgrades, to encourage on-line purchases of related products, and to enable one-to-one customized marketing and other services.

In one embodiment, two software modules are used to implement various embodiments of the invention. One is resident on a user's system, and is used to access a predetermined web site. For example, in one embodiment, the operating system and Basic Input and Output System (BIOS) are pre-installed on a computer system, and when the computer system is subsequently first powered up, an application, referred to for discussion purposes as the first software module (in one embodiment, the first software module is the initial start-up application (ISUA), which will be described in the following sections), will allow the launching of one or more executable programs in the pre-boot environment. In one embodiment, the first software module facilitates the launching of one or more executable programs prior to the loading, booting, execution and/or running of the OS. In one embodiment, the user is encouraged to select the use of such a program (i.e., the use of the first software module), and in alternative embodiments, the program is automatically launched. The program(s) contained in the first software module enables tools and utilities to run at an appropriate time, and with proper user authorization, also allow the user to download a second software module that includes drivers, applications and additional payloads through the Internet connection on the PC. The programs may also provide for remote management of the system if the OS fails to launch successfully.

Once the second software module has been delivered, it may become memory resident, and may disable the transferred copy of the first software module. The original copy of the first software module still residing in the system's non-volatile memory remains idle until the second software module fails to function, becomes corrupted or is deleted, upon which a copy of the original first software module is again transferred as described above. The second software module may include an application that connects the user to a specific server on the Internet and directs the user to a predetermined web site to seek authorization to down load further subscription material. The second software module may also include content that is the same or similar to the content of the first software module.

In one embodiment, the system may also include an initial payload that is stored in Read Only Memory BIOS (ROM BIOS). In one embodiment, the initial payload is part of the first software module (e.g., the ISUA). In an alternative embodiment, the initial payload is stored as a module in ROM BIOS, separate from the first software module. In one embodiment, the initial payload is launched from ROM BIOS and displayed on the screen after the Power On Self Test (POST) but prior to the booting, loading and/or execution of the OS. This may occur at a predetermined time, such as when the system is being manufactured, assembled and tested, or when the end user first activates the system. In an alternate embodiment, this initial payload is copied to a predetermined location (such as the system's hard disk) at a predetermined time, such as when the system is being manufactured, assembled and tested, or when the end user first activates the system. Once copied, the payload executes after POST but prior to operation of the OS, and may display graphics, advertisements, animation, Joint Photographic Experts Group (JPEG)/Moving Picture Experts Group (MPEG) formatted material on the screen. When additional programs and/or payloads are delivered (via the Internet or other outside connection), the display screen may be used to provide customized screens in the form of messages or graphics prior to and during booting of the OS. In addition, executable programs delivered in the first software module, as well as subsequent programs (such as the second software module) downloaded from the web site, may be used to survey the PC to determine various types of devices, drivers, and applications installed. In one embodiment, as described in co-pending U.S. patent application Ser. No. 09/336,289 entitled "Method and Apparatus for Automatically Installing And Configuring Software on a Computer" incorporated herein by reference, the first software module is used to identify and to automatically create shortcuts and/or bookmarks for the user. The programs downloaded from the website may include software that collects and maintains a user profile based on the user's preferences. Such information may be provided to the infomediary, which subsequently forwards portions of the information and/or compiled data based on the information to suppliers and other businesses to obtain updates or revisions of information provided by the suppliers and other businesses.

Referring to FIG. 1, the information distribution system 10 comprises a service center 20 that is connected over one or more communications links $30_1$–$30_N$ to one or more user computer systems $40_1$–$40_N$ ("40"). The service center 20 includes one or more servers 22, one or more databases 24, and one or more computers $26_1$–$26_M$. The one or more computers $26_1$–$26_M$ are capable of simultaneous access by a plurality of the user computer systems $40_1$–$40_N$. If a plurality of computers are used, then the computers $26_1$–$26_M$ may be connected by a local area network (LAN) or any other similar connection technology. However, it is also possible for the service center 20 to have other configurations. For example, a smaller number of larger computers (i.e. a few mainframe, mini, etc. computers) with a number of internal programs or processes running on the larger computers capable of establishing communications links to the user computers.

The service center 20 may also be connected to a remote network 50 (e.g., the Internet) or a remote site (e.g., a satellite, which is not shown in FIG. 1). The remote network 50 or remote site allows the service center 20 to provide a wider variety of computer software, content, etc. that could be stored at the service center 20. The one or more databases 24 connected to the service center computer(s), e.g., computer $26_1$, are used to store database entries consisting of computer software available on the computer(s) 26. In one embodiment, each user computer $40_1$–$40_N$ has its own secure database (not shown), that is not accessible by any other computer. The communication links $30_1$–$30_N$ allow the one or more user computer systems $40_1$–$40_N$ to simultaneously connect to the computer(s) $26_1$–$26_M$. The connections are managed by the server 22.

After a user computer system 40 establishes two-way communications with the information service computer 26, the content is sent to the user computer system 40 in a manner hereinafter described. The downloaded content includes an application that surveys the user and/or the user computer system's hardware and/or software to develop a user profile as well as a profile of the user's system. The information gathered from the user and/or user's computer system is subsequently provided to the service center 20, which provides additional content to the user computer 40 based on the user and system profile. The database entries from the database connected to the service computer 26 contain information about computer software, hardware, and third party services and products that are available to a user. Based on the user and/or system profile, the content is further sent to the user computer for display. The content may also include a summary of information such as the availability of patches and fixes for existing computer software, new versions of existing computer software, brand new computer software, new help files, etc. The content may further include information regarding availability of hardware and third party products and services that is of interest to the user. The user is then able to make one or more choices from the summary of available products and services, and request that the products be transferred from the service computer 26 to the user computer. Alternatively, the user may purchase the desired product or service from the summary of available products and services.

Figure 2:
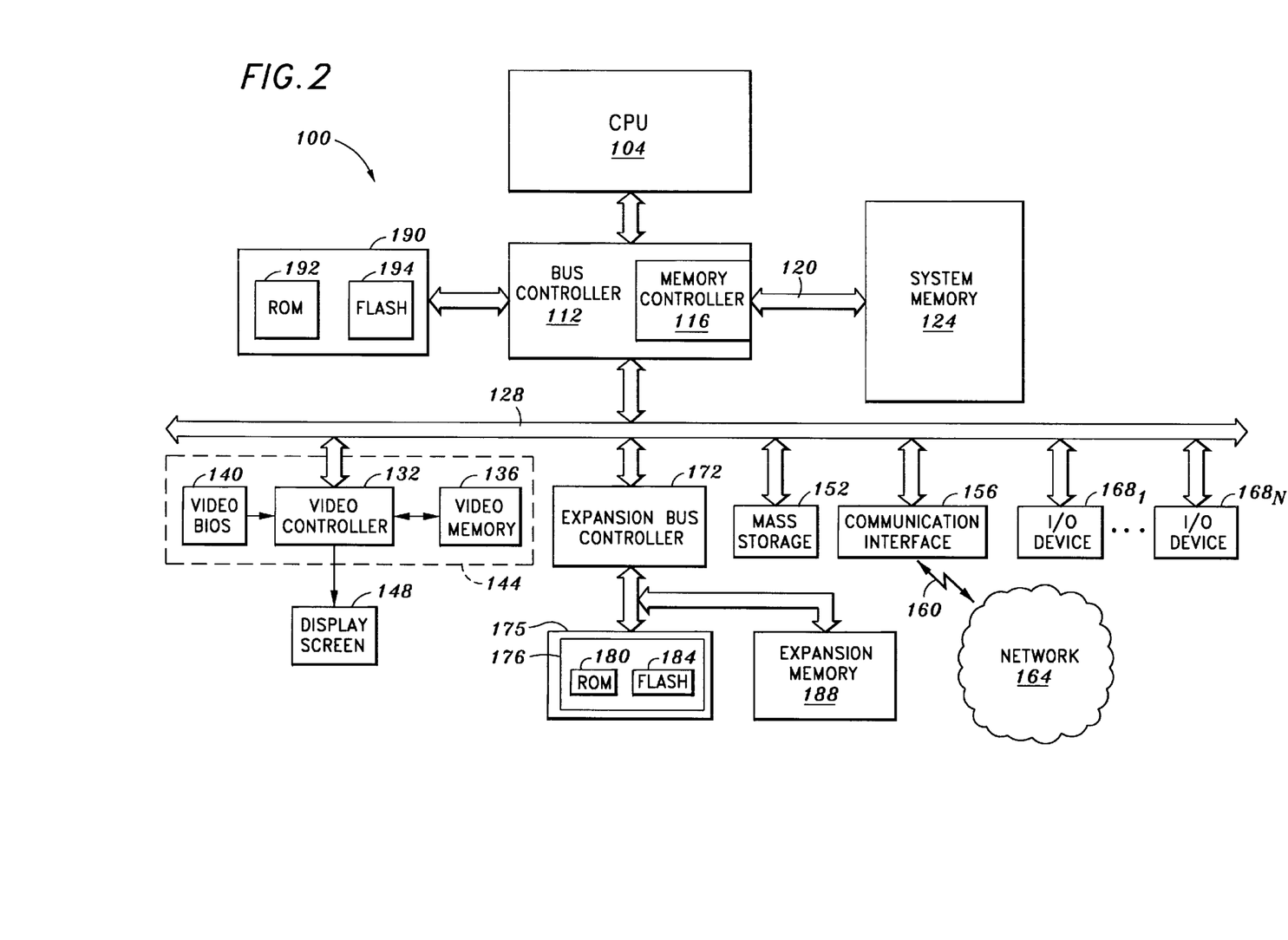
FIG. 2 illustrates an exemplary processor system or user computer system which implements embodiments of the present invention.

FIG. 2 illustrates an exemplary computer system 100 that implements embodiments of the present invention. The computer system 100 illustrates one embodiment of user computer systems $40_1$–$40_N$ and/or computers $26_1$–$26_M$ (FIG. 1), although other embodiments may be readily used.

Referring to FIG. 2, the computer system 100 comprises a processor or a central processing unit (CPU) 104. The illustrated CPU 104 includes an Arithmetic Logic Unit (ALU) for performing computations, a collection of registers for temporary storage of data and instructions, and a control unit for controlling operation for the system 100. In one embodiment, the CPU 104 includes any one of the x86, Pentium™, Pentium II™, and Pentium Pro™ microprocessors as marketed by Intel™ Corporation, the K-6 microprocessor as marketed by AMD™, or the 6x86MX microprocessor as marketed by Cyrix™ Corp. Further examples include the Alpha™ processor as marketed by Digital Equipment Corporation™, the 680X0 processor as marketed by Motorola™; or the Power PC™ processor as marketed by IBM™. In addition, any of a variety of other processors, including those from Sun Microsystems, MIPS, IBM, Motorola, NEC, Cyrix, AMD, Nexgen and others may be used for implementing CPU 104. The CPU 104 is not limited to microprocessor but may take on other forms such as microcontrollers, digital signal processors, reduced instruction set computers (RISC), application specific integrated circuits, and the like. Although shown with one CPU 104, computer system 100 may alternatively include multiple processing units.

The CPU 104 is coupled to a bus controller 112 by way of a CPU bus 108. The bus controller 112 includes a memory controller 116 integrated therein, though the memory controller 116 may be external to the bus controller 112. The memory controller 116 provides an interface for access by the CPU 104 or other devices to system memory 124 via memory bus 120. In one embodiment, the system memory 124 includes synchronous dynamic random access memory (SDRAM). System memory 124 may optionally include any additional or alternative high speed memory device or memory circuitry. The bus controller 112 is coupled to a system bus 128 that may be a peripheral component interconnect (PCI) bus, Industry Standard Architecture (ISA) bus, etc. Coupled to the system bus 128 are a graphics controller, a graphics engine or a video controller 132, a mass storage device 152, a communication interface device 156, one or more input/output (I/O) devices $168_1$–$168_N$, and an expansion bus controller 172. The video controller 132 is coupled to a video memory 136 (e.g., 8 Megabytes) and video BIOS 140, all of which may be integrated onto a single card or device, as designated by numeral 144. The video memory 136 is used to contain display data for displaying information on the display screen 148, and the video BIOS 140 includes code and video services for controlling the video controller 132. In another embodiment, the video controller 132 is coupled to the CPU 104 through an Advanced Graphics Port (AGP) bus.

The mass storage device 152 includes (but is not limited to) a hard disk, floppy disk, CD-ROM, DVD-ROM, tape, high density floppy, high capacity removable media, low capacity removable media, solid state memory device, etc., and combinations thereof. The mass storage device 152 may include any other mass storage medium. The communication interface device 156 includes a network card, a modem interface, etc. for accessing network 164 via communications link 160. The I/O devices $168_1$–$168_N$ include a keyboard, mouse, audio/sound card, printer, and the like. The I/O devices $168_1$–$168_N$ may be a disk drive, such as a compact disk drive, a digital disk drive, a tape drive, a zip drive, a jazz drive, a digital video disk (DVD) drive, a solid state memory device, a magneto-optical disk drive, a high density floppy drive, a high capacity removable media drive, a low capactiy media device, and/or any combination thereof. The expansion bus controller 172 is coupled to non-volatile memory 175 which includes system firmware 176. The system firmware 176 includes system BIOS 82, which is for controlling, among other things, hardware devices in the computer system 100. The system firmware 176 also includes ROM 180 and flash (or EEPROM) 184. The expansion bus controller 172 is also coupled to expansion memory 188 having RAM, ROM, and/or flash memory (not shown). The system 100 may additionally include a memory module 190 that is coupled to the bus controller 112. In one embodiment, the memory module 190 comprises a ROM 192 and flash (or EEPROM) 194.

As is familiar to those skilled in the art, the computer system 100 further includes an operating system (OS) and at least one application program, which in one embodiment, are loaded into system memory 124 from mass storage device 152 and launched after POST. The OS may include any type of OS including, but not limited or restricted to, DOS, Windows™ (e.g., Windows 95™, Windows 98™, Windows NT™), Unix, Linux, OS/2, OS/9, Xenix, etc. The operating system is a set of one or more programs which control the computer system's operation and the allocation of resources. The application program is a set of one or more software programs that performs a task desired by the user.

In accordance with the practices of persons skilled in the art of computer programming, the present invention is described below with reference to symbolic representations of operations that are performed by computer system 100, unless indicated otherwise. Such operations are sometimes referred to as being computer-executed. It will be appreciated that operations that are symbolically represented include the manipulation by CPU 104 of electrical signals representing data bits and the maintenance of data bits at memory locations in system memory 124, as well as other processing of signals. The memory locations where data bits are maintained are physical locations that have particular electrical, magnetic, optical, or organic properties corresponding to the data bits.

When implemented in software, the elements of the present invention are essentially the code segments to perform the necessary tasks. The program or code segments can be stored in a processor readable medium or transmitted by a computer data signal embodied in a carrier wave over a transmission medium or communication link. The "processor readable medium" may include any medium that can store or transfer information. Examples of the processor readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc.

The code segments may be downloaded via computer networks such as the Internet, Intranet, etc.

Figure 3:
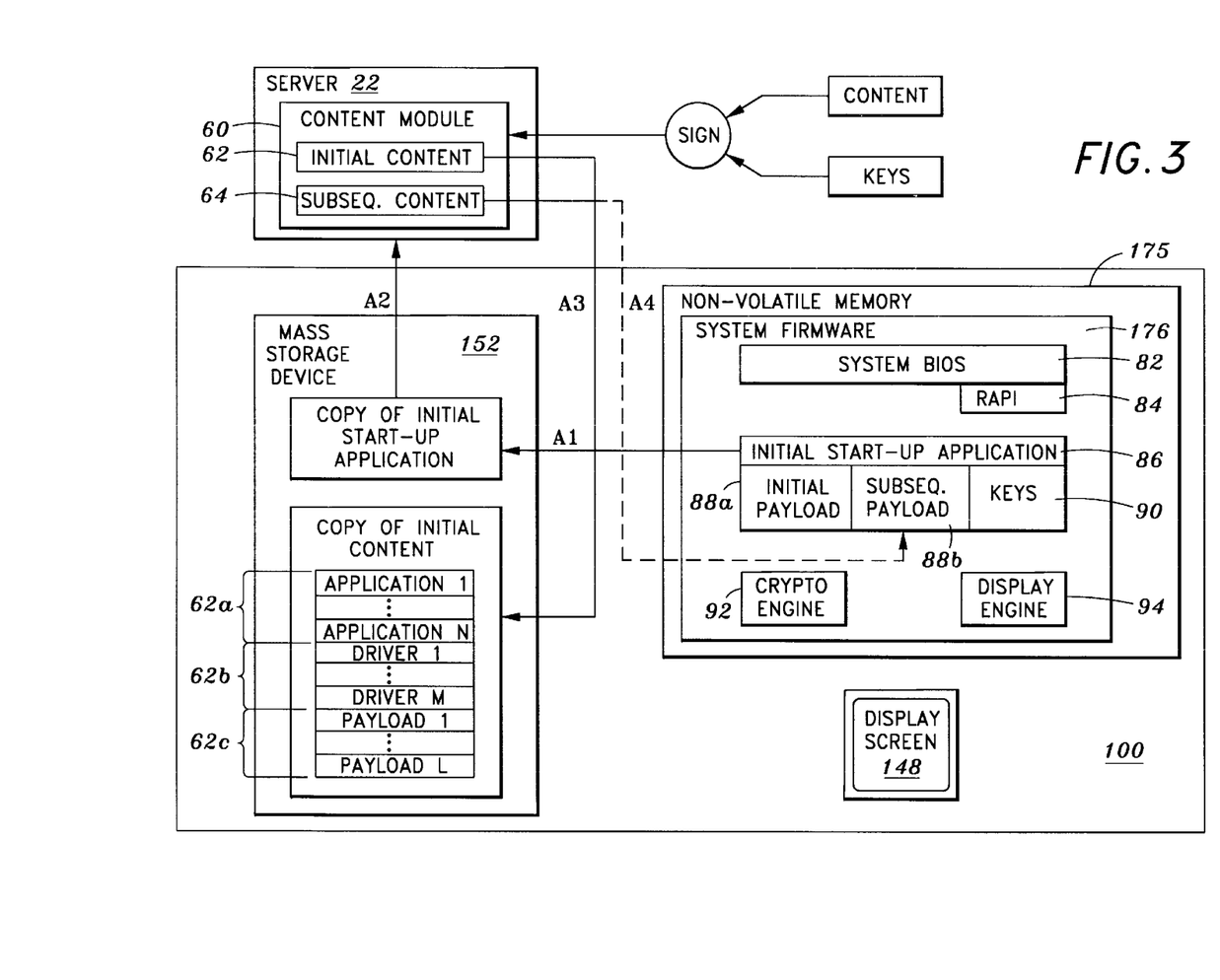
FIG. 3 illustrates a logical diagram of one embodiment of the invention.

FIG. 3 illustrates a logical diagram of computer system 100. Referring to FIGS. 2 and 3, the system firmware 176 includes software modules and data that are loaded into system memory 124 during POST and subsequently executed by the processor 104. In one embodiment, the system firmware 176 includes a system BIOS module 82 having system BIOS handlers, hardware routines, etc., a ROM application program interface (RAPI) module 84, an initial start-up application (ISUA) module 86, an initial payload 88, cryptographic keys 90, a cryptographic engine 92, and a display engine 94. The aforementioned modules and portions of system firmware 176 may be contained in ROM 180 and/or flash 184. Alternatively, the aforementioned modules and portions of system firmware 176 may be contained in ROM 190 and/or flash 194. The RAPI 84 provides a secure interface between ROM application programs and system BIOS 82. The RAPI 84, ISUA 86, and initial payload 88a may each be separately developed and stored in the system firmware 176 prior to initial use of the computer system 100. In one embodiment, the RAPI 84, ISUA 86, and initial payload 88 each includes proprietary software developed by Phoenix Technologies, Ltd. One embodiment of RAPI 84 is described in co-pending U.S. patent application Ser. No. 6,148,387 entitled "System and Method for Securely Utilizing Basic Input and Output System (BIOS) Services," filed on Jun. 18, 1999, assigned to Phoenix Technologies, Ltd., and which is incorporated herein by reference. One embodiment of ISUA 86 is described in co-pending U.S. patent application Ser. No. 09/336,289 entitled "Method and Apparatus for Automatically Installing and Configuring Software on a Computer," filed on Jun. 18, 1999, assigned to Phoenix Technologies, Ltd., and which is incorporated herein by reference.

Figure 4A:
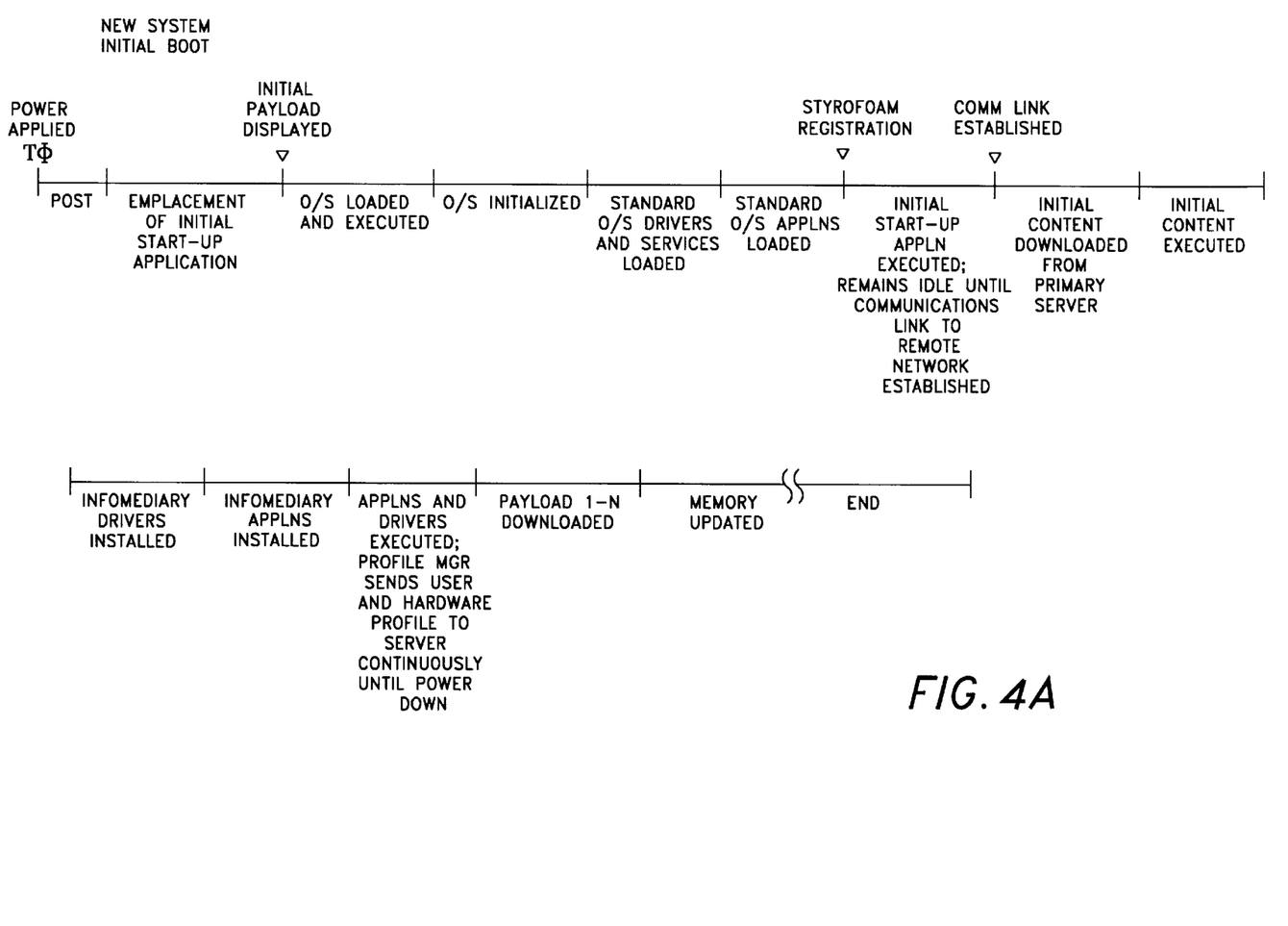
FIG. 4A and FIG. 4B illustrates one embodiment of a process flow chart provided in accordance with the principles of the invention.
Figure 4B:
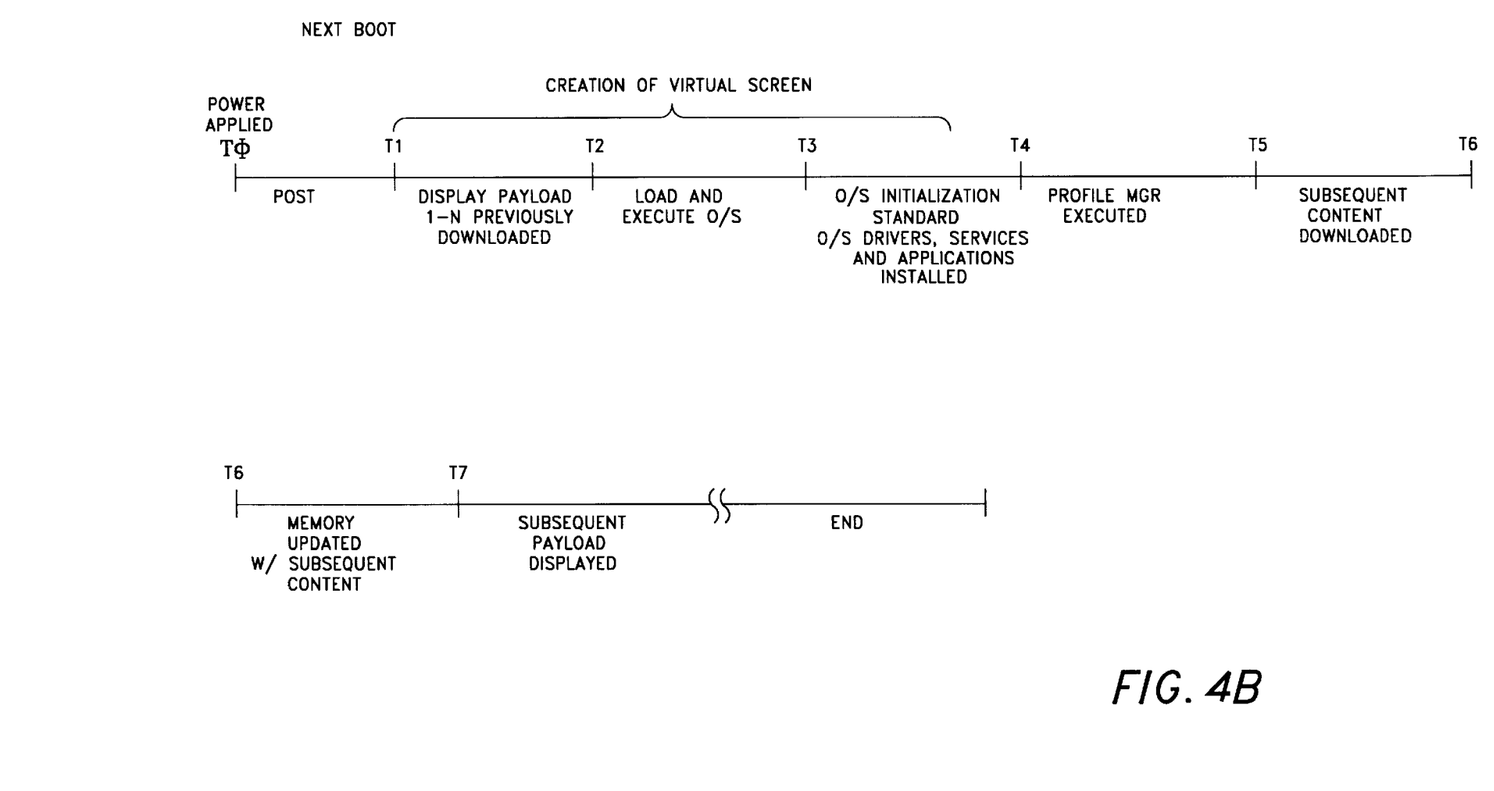

In one embodiment, as shown in FIGS. 3 and 4A and 4B, after power is initially turned on to a new computer system 100, the system commences with POST procedures. During the initial POST, the ISUA 86 is transferred to the mass storage device 152, as shown by A1. In one embodiment, such a transfer is made during the manufacturing and/or assembly process, when the system 100 is first powered up after the operating system has been installed (but prior to loading and running the operating system). In an alternative embodiment, such a transfer may be made after the manufacturing and/or assembly process, after the user receives and powers up the system 100. In a further alternate embodiment, during the transfer of the ISUA 86, additional programs, applications, drivers, data, graphics and other information may also be transferred (for example, from ROM) to the mass storage device 152. For example, the transfer may include the transfer of the initial payload 88a to the mass storage device 152, subsequent to which the initial payload is delivered from the mass storage device 152. Alternatively, the initial payload may be delivered from the ROM. One embodiment of the system and process for facilitating such a transfer is described in co-pending U.S. patent application Ser. No. 09/336,067, entitled "System and Method for Transferring an Application Program from System Firmware to a Storage Device" filed on Jun. 18, 1999, which is assigned to Phoenix Technologies, Ltd., the contents of which are incorporated herein by reference. Alternative embodiments of the system and process for facilitating such a transfer are described in co-pending U.S. patent application Ser. No. 09/272,859, entitled "Method and Apparatus for Providing Memory-based Device Emulation" filed on Mar. 19, 1999, in co-pending U.S. Patent Continuation-in-part application Ser. No. 09/336,307, entitled "Method and Apparatus for Providing Memory-Based Device Emulation" filed on Jun. 18, 1999, and in co-pending U.S. patent application Ser. No. 09/336,281, entitled "System and Method for Inserting One or More Files Onto Mass Storage" filed Jun. 18, 1999, each of which is assigned to Phoenix Technologies, Ltd., the assignee of the present invention, the contents of each of which are incorporated herein by reference.

In one embodiment, the ISUA 86 is a computer software executable program that will determine if there are preinstalled programs that are resident on the end user's system. If so, it will identify those preinstalled programs and create shortcuts (on the desktop in the case of a Windows operating system), or bookmarks, to allow the user to automatically launch the programs. In this embodiment, the executable program is also capable of initiating and establishing two-way communications with one or more applications on the server 22 and/or any one of the service computers 26 (FIG. 1), as described below. Moreover, in one embodiment, graphical content of the initial payload 88a is displayed by display engine 94 on the user's display screen 148 during POST. Alternatively, the graphical content of the initial payload 88a may be displayed after a subsequent booting process. For example, as part of the user's profile as described below, the user may be asked if he or she would like to obtain additional information regarding one or more products and/or services. If the user so desires, content regarding the desired products and/or services will be displayed during subsequent boot processes.

Once POST is completed, the OS is loaded, executed, and initialized. Standard OS drivers and services are then loaded. The user is then prompted to enter registration information including demographic information such as age, gender, hobbies, etc. In addition, the ISUA 86 is executed, and runs in the background, remaining idle until it detects a communication link established between the computer system 100 and a remote server (e.g., server 22 of FIG. 1) over Network 164 of FIG. 2 (e.g., over the Internet). In one embodiment, the ISUA 86 may search through the operating system to determine if there are applications that have been pre-loaded and pre-installed onto the system. If so, the ISUA 86 may automatically provide short cuts and/or bookmarks for the applications to launch into a predetermined server once the communication link is established. This communication link can be established with a network protocol stack, (e.g. TCP/IP) through sockets, or any other two-way communications technique known in the art. Once the communication link 30 is established, the ISUA 86 issues a request signal to the server 22 (as shown by A2) to download an initial content package 62 from a content module 60. Responsive to the request, the server downloads the initial content package 62 (as shown by A3), which, in one embodiment, is stored in the mass storage device 152. In one embodiment, the initial content 62 and subsequent content 64 may be developed separately, and each is encrypted and/or digitally signed using encryption keys, prior to storing of the initial content 62 and subsequent content 64 on the server 22. When the initial content 62 and/or subsequent content 64 is/are subsequently downloaded into system 100, the crypto engine 92 will use keys 90 to decrypt the initial content 62 and/or subsequent content 64.

As discussed earlier, the initial content package 62 may include applications 62a, drivers 62b, and payloads 62c. In one embodiment, the applications 62a include a data loader application and a profile manager application. The data loader application functions in the same or a similar manner as ISUA 86, and once downloaded, disables and replaces the ISUA 86. More specifically, the data loader application is a computer software program which is also capable of initiating, establishing, and terminating two-way communications between the server 22 and the computer system 100. The data loader application also provides traffic control management between the server 22 and computer system 100, as well as other functions to facilitate communication between the end user's system and the designated server, and content downloading to the end user's system.

The profile manager obtains the user and system profiles of the computer system 100 based on user preferences, system hardware, and software installed at the computer system 100. Upon obtaining the user and system profile of the computer system 100, the profile manager application forwards the results to the data loader application, which subsequently provides the information to the server 22, which matches the user indicted preferences with database 24 (FIG. 1). The results may be forwarded at predetermined intervals or at the user's request. The server 22 then processes the user profile or demographic data and targets content to the users which have similar profiles. In addition, the user profile data of a plurality of users are compiled on the server 22 and aggregated to create an aggregate user profile model. Content is then transmitted to user computer system's based on the user profile data and/or the aggregate user profile model (as shown by A4). The subsequent content 64 is downloaded and stored in system firmware 176, designated by numeral 88b. In one embodiment, the subsequent content 64 is stored in non-volatile memory such as flash or EEPROM, with the loading of the subsequent content being done by reflashing the ROM, as is well known by those skilled in the art. The subsequent content 64 may also be stored as one or more files on mass storage device 152 or may be used to modify the Windows™ system file (under the Windows™ environment). The profile collection process is continued as long as the computer system 100 is activated. In one embodiment, content may be downloaded after the user's profile is received and analyzed at the server 22.

When the computer system 100 is subsequently powered up (see FIG. 4B), the system again performs POST. The content that was previously downloaded and stored in system firmware 176, and subject to copyright issues being resolved, is then displayed, prior to loading and/or execution of the operating system. In the Windows™ environment, the Windows™ logo, which is displayed during the initial loading of the operating system, is subsequently replaced by one or more screen that display the previously downloaded content stored in system firmware 176.

In the case of storing the content as one or more files on the mass storage device 152, as opposed to reflashing the ROM, the Windows™ logo file, which is displayed during boot-up and shutdown, may be altered or replaced. One embodiment utilizing this approach involves replacing the corresponding Windows™ system files with the one or more files showing the content (e.g., a graphic file), as described in co-pending U.S. patent application Ser. No. 6,373,498, entitled "Displaying Images during Boot-up and Shutdown" filed on Jun. 18, 1999, which is assigned to Phoenix Technologies, LTD., the contents of which are incorporated herein by reference. The boot-up Windows display file is named LOGO.SYS and is usually located in the Windows directory. First the Windows™ LOGO.SYS file is transferred from the Windows directory to another directory. Then, the content graphics file is renamed as LOGO.SYS and is transferred to the Windows™ directory. The operating system retrieves this file when the operating system is first launched, and hence the content is displayed on the display screen. Windows™ expects the LOGO.SYS file to be a bit-mapped file with resolution 320×400 and 256 colors although Windows™ will later stretch the resolution to 640×400 for displaying purposes. Therefore, the content graphics file is to be the same graphics format (usually named with the extension ".BMP" before being renamed to LOGO.SYS).

The operating system is then loaded, executed, and initialized. The standard operating system drivers and applications are also loaded. The profile manager is then executed.

When a link has been established with the predetermined web site, additional content may be downloaded and subsequently displayed. Such additional content are either provided arbitrarily or provided based on the information obtained from a survey of the user or the user's system. In one embodiment, once the boot process is completed, a portion of the display screen may be used to provide icons or shortcuts that are used to access detailed information regarding the previously displayed messages or advertisements. In a further embodiment, the messages or advertisements may again be displayed during the shut-down process, for example, replacing the screen display that displays the message "Windows is shutting down" or "It is now safe to turn off your computer" with other selected content.

Detailed Description

Figure 5:
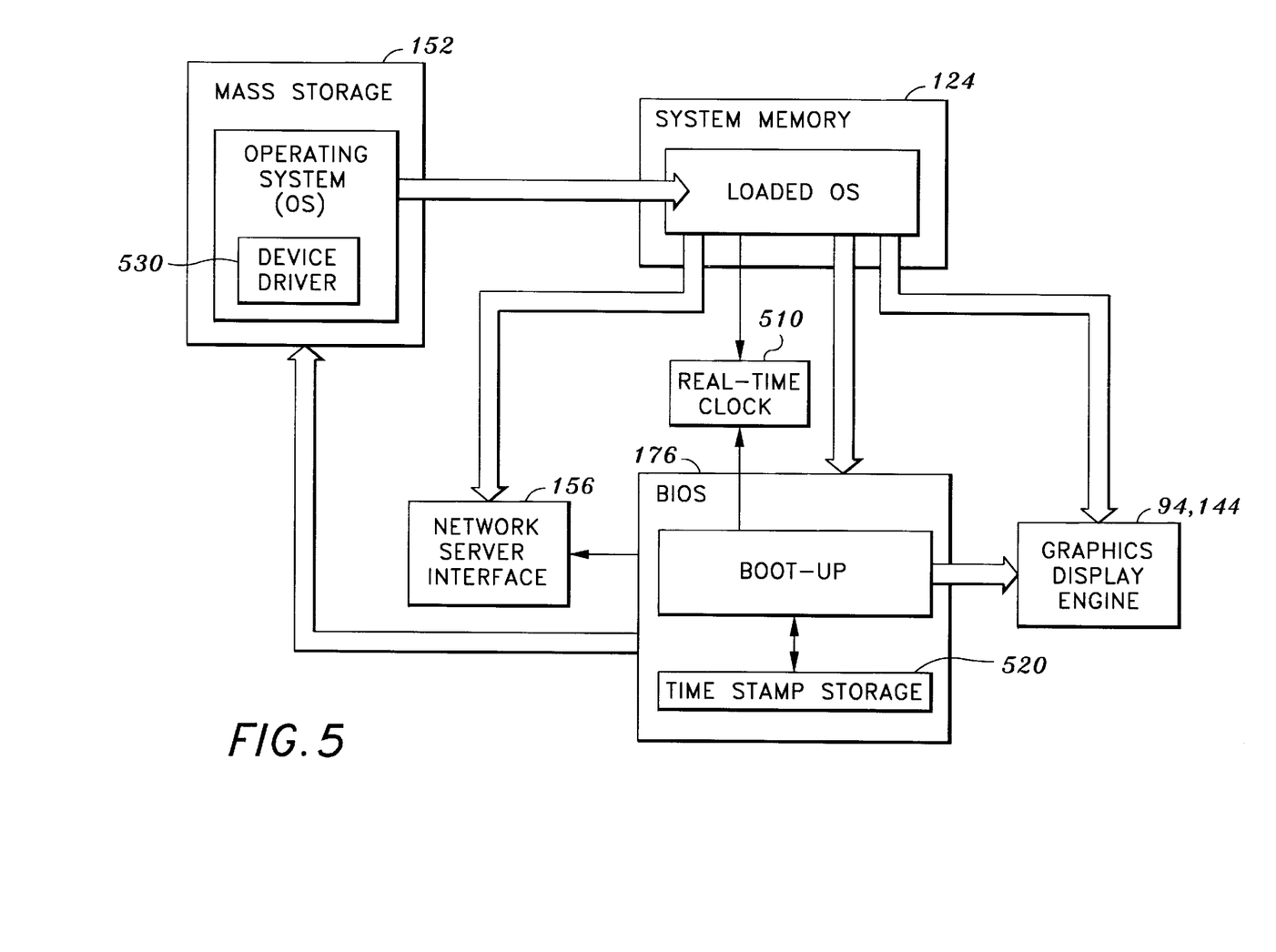
FIG. 5 is a diagram illustrating an environment to determine the loading time of a program according to one embodiment of the invention.

FIG. 5 is a diagram illustrating an environment 500 to determine the loading time of a program according to one embodiment of the invention. The environment 500 includes the BIOS 82, the mass storage 152, a system memory 124, the graphics display engine 94, the network interface 164, and a real-time clock (RTC) 510.

The BIOS contains the boot-up code and a time stamp structure 520. Upon power up, the boot up code renders the BIOS display on the display screen via the graphics display engine. The BIOS display may include messages, announcements, texts, graphics, banners, advertisements, etc. The time stamp structure 520 is a storage element that stores the start and end times of the loading, the identification of the computer system, and the computed load time. The time stamp structure 520 is initially stored in a writable memory such as a programmable ROM or a flash memory.

The mass storage includes an operating system (OS). The OS contains a device driver 530. The OS is a set of programs that control the computer operations and allocate system resources. The device driver 530 is callable from the OS and is a special program that is used to perform tasks related to the determining of the loading time. The device driver 530 performs the following tasks: reading the time from the RTC 510, converting the time from the RTC 510 into a standard time format, retrieving the time stamp structure 520 from the BIOS, recording the identification of the computer system or the customer, computing the loading time, saving the times and the computed loading time into the time stamp structure, saving the time stamp structure 520 in a storage area, and transferring the time stamp structure 520 to a remote server via the network interface.

The system memory contains the loaded OS and the device driver. The system memory is accessible to the processor in the computer system. When the OS is loaded into the system memory by the BIOS, the OS calls the device driver 530 so that the device driver can perform its tasks as above.

The graphics display engine controls the display of the graphics or texts on the display screen of the computer system. The network interface provides interface to a number of communication channels. The network interface provides access to a remote server to store the time stamp structure 520 as transferred by the device driver after the loading time is determined.

The real-time clock 510 is a device that provides the time information on a real-time basis. The RTC 510 is accessible to both the BIOS and the device driver 530.

Figure 6:
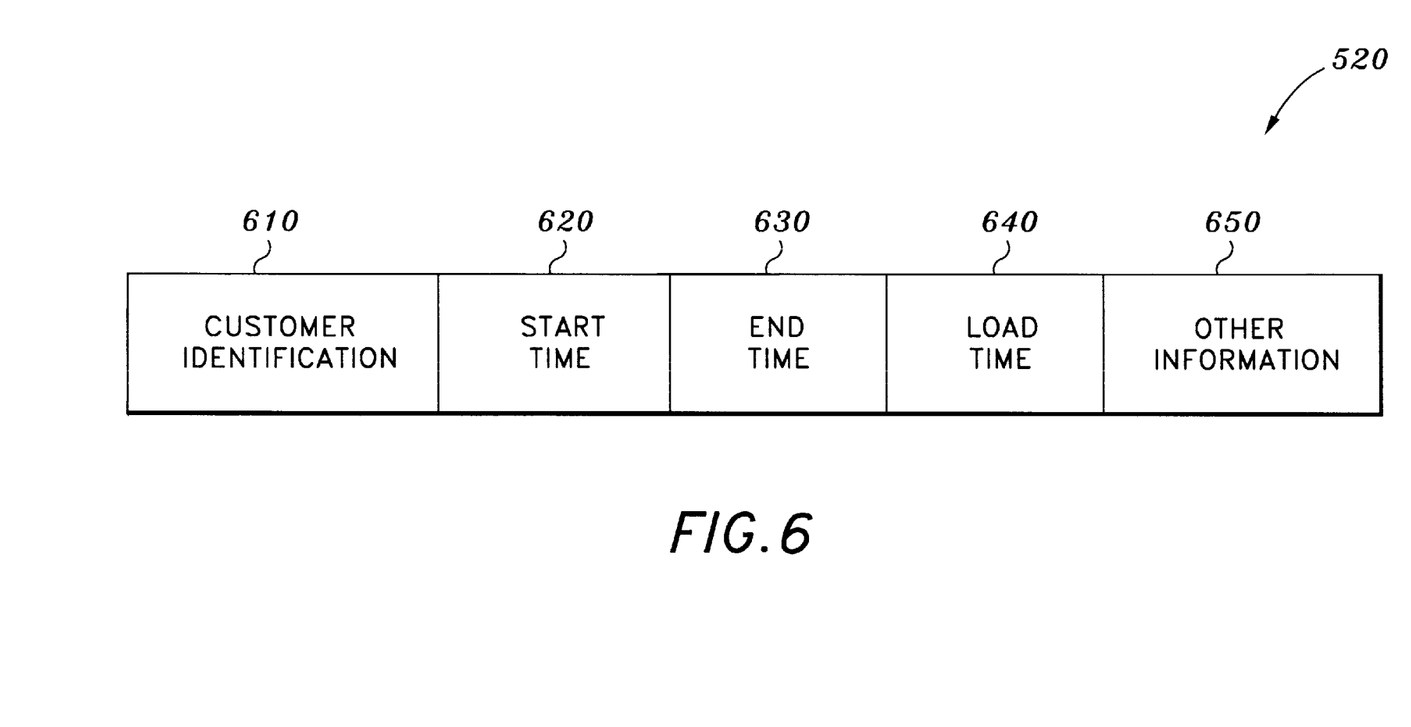
FIG. 6 is a diagram illustrating format of a time stamp structure according to one embodiment of the invention.

FIG. 6 is a diagram illustrating format of the time stamp structure 520 according to one embodiment of the invention. The time stamp structure 520 includes a customer identification 610, a start time 620, an end time 630, a load time 640, and other information 650.

The customer identification 610 is the identification of the computer system or the customer that uses the computer system. The customer identification 610 may be assigned in advance and provides a unique identification code to identify the environment that the OS is being loaded.

The start time 620 is the time that the loading of the OS starts. The start time 620 may be the raw time read from the RTC 510 or the standardized time converted from the raw time read from the RTC 510. In one embodiment, the standardized time is the time in seconds since Jan. $1^{st}$, 1980. The start time is obtained by the BIOS at the beginning of the loading of the OS. The end time 630 is the time that the loading of the OS ends. The end time 630 may be the raw time read from the RTC 510 or the standardized time converted from the raw time read from the RTC 510. The end time is obtained by the device driver 530 at the end of the loading of the OS.

The load time 640 is the loading time of the OS as obtained from the start time 620 and the end time 630. The load time 640 is typically the time expressed in the standardized time format. Depending on the type of the computer, the speed of the processor in the computer system, and the OS, the load time 640 typically ranges from a few seconds to about 20 seconds. The load time 640 is determined by subtracting the start time 620 from the end time 630.

Other information 650 contains additional information as needed by the system administration. Examples of the additional information may include the OS version, the BIOS version, the type of the computer, etc.

Figure 7:
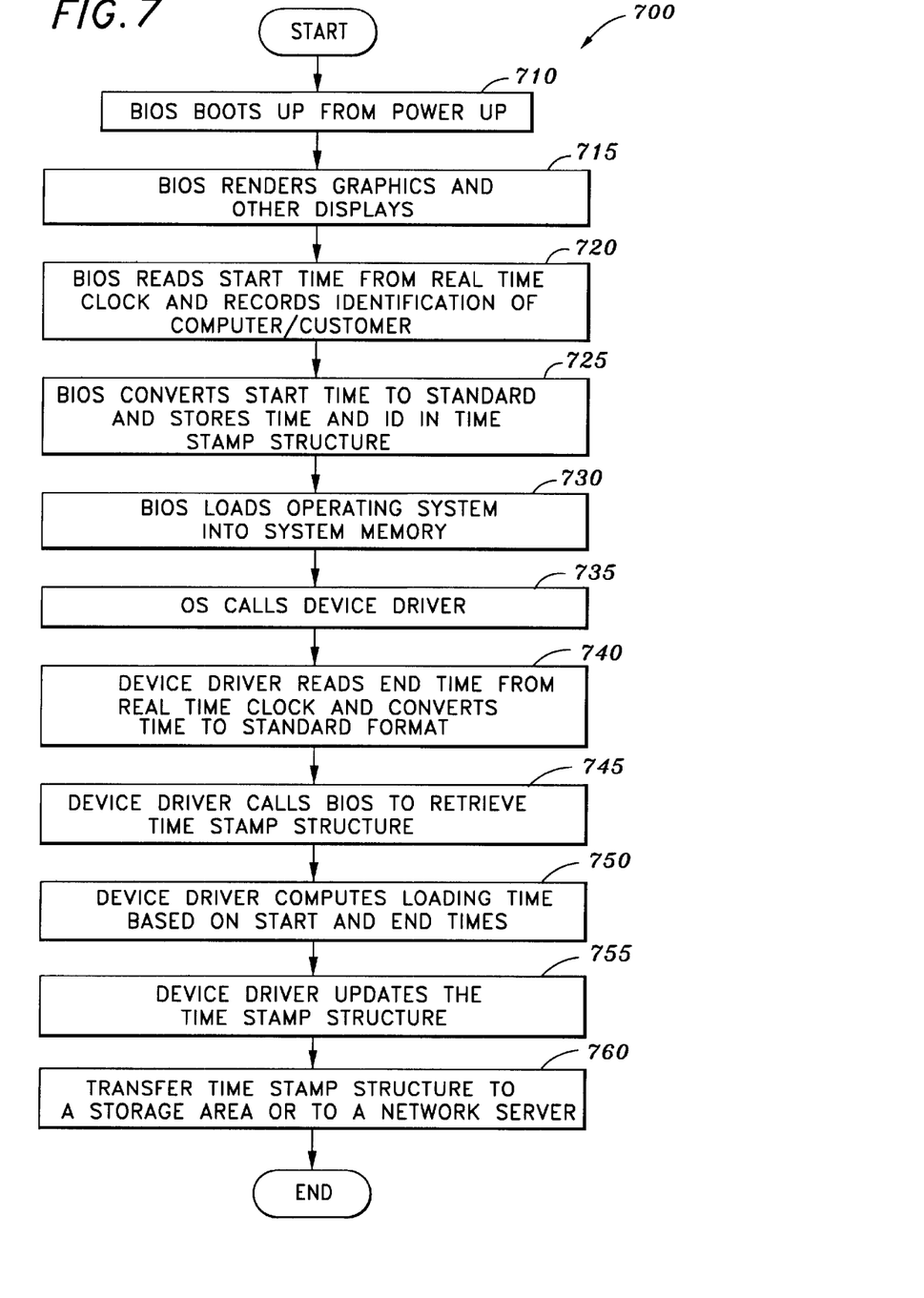
FIG. 7 is a flowchart illustrating a process to determine the loading time of a program according to one embodiment of the invention.

FIG. 7 is a flowchart illustrating a process 700 to determine the loading time of a program according to one embodiment of the invention.

Upon START, the BIOS boots up from the power up sequence (Block 710). The BIOS renders graphics and displays BIOS information such as summary statistics on the display screen (Block 715). Then the BIOS reads the start time from the real time clock and records the identification (ID) of the computer system or the customer (Block 720). The BIOS converts the start time as read from the RTC using the standardized format and stores the recorded ID and the standardized start time in the time stamp structure (Block 725).

The BIOS then loads the OS from the mass storage into the system memory (Block 730). Upon loaded into the system memory, the OS calls the device driver by invoking an appropriate system call (Block 735). The device driver reads the end time from the RTC and converts the end time using the standardized time format (Block 740). Then the device driver calls the BIOS to retrieve the time stamp structure (Block 745). The device driver obtains the standardized start time from the time stamp structure and computes the loading time using the standardized start time and end time (Block 750). The loading time is computed by subtracting the standardized start time from the standardized end time. The device driver then updates the time stamp structure by copying the standardized start and end times, the computed loading time, the identification and other information (Block 755).

Next, the device driver stores the updated time stamp structure in a storage area such as the mass storage and/or transfers the updated time stamp structure to a remote server via the network interface (Block 760). The process 700 is then terminated.

Thus, the present invention is an efficient technique to determine the loading time of an operating system. The time information and the customer identification are saved in a storage area or transferred to a remote server. The technique provides a convenient way to determine the air time of the displaying of the contents from the infomediary system.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A method to determine loading time of an operating system (OS) in a computer system, the method comprising:

retrieving a first time from a real-time clock by a basic input and output system (BIOS) prior to loading the OS into memory of the computer system;

loading the OS into memory of the computer system, the OS containing a device driver;

retrieving a second time from the real-time clock by the device driver;

computing a time difference based on the first and second times to obtain the loading time of the OS; and determining a duration of information to be displayed by said computer system based on said time difference.

2. The method of claim 1 further comprises:

recording an identification of the computer system;

converting the first time using a time format to a third time; and copying the third time into a time stamp structure.

3. The method of claim 2 further comprises:

converting the second time using the time format to a fourth time; and copying the fourth time into the time stamp structure.

4. The method of claim 3 further comprises:

copying the identification and the time difference into the time stamp structure; and saving the time stamp structure in a storage area.

5. The method of claim 4 wherein loading the OS comprises:

transferring the OS from a storage device to the memory; and invoking the device driver from the OS.

6. The method of claim 5 wherein retrieving the second time comprises:

executing the device driver to read the second time from the real-time clock.

7. The method of claim 3 wherein computing the time difference comprises:

subtracting the third time from the fourth time to generate the time difference.

8. The method of claim 4 wherein the storage area is located in one of a local mass storage device and a remote server.

9. The method of claim 2 wherein the information is displayed during the loading time of the OS.

10. The method of claim 9 wherein the information is downloaded from a remote server via a communication network channel.

11. A computer program product comprising:

a computer usable medium having computer program code embodied therein to determine loading time of an operating system (OS) in a computer system, the computer program product having:

computer readable program code for retrieving a first time from a real-time clock by a basic input and output system (BIOS) prior to loading the OS into memory of the computer system;

computer readable program code for loading the OS into memory of the computer system, the OS containing a device driver;

computer readable program code for retrieving a second time from the real-time clock by the device driver;

computer readable program code for computing a time difference based on the first and second times to obtain the loading time of the OS; and computer readable program code for determining a duration of information to be displayed by said computer system based on said time difference.

12. The computer program product of claim 11 further comprises:

computer readable program code for recording an identification of the computer system;

computer readable program code for converting the first time using a time format to a third time; and computer readable program code for copying the third time into a time stamp structure.

13. The computer program product of claim 12 further comprises:

computer readable program code for converting the second time using the time format to a fourth time; and computer readable program code for copying the fourth time into the time stamp structure.

14. The computer program product of claim 13 further comprises:

computer readable program code for copying the identification and the time difference into the time stamp structure; and computer readable program code for saving the time stamp structure in a storage area.

15. The computer program product of claim 14 wherein the program code segment for loading the OS comprises:

computer readable program code for transferring the OS from a storage device to the memory; and computer readable program code for invoking the device driver from the OS.

16. The computer program product of claim 15 wherein the program code segment for retrieving the second time comprises:

computer readable program code for executing the device driver to read the second time from the real-time clock.

17. The computer program product of claim 13 wherein the program code segment for computing the time difference comprises:

computer readable program code for subtracting the third time from the fourth time to generate the time difference.

18. The computer program product of claim 14 wherein the storage area is located in one of a local mass storage device and a remote server.

19. The computer program product of claim 12 wherein the information is displayed during the loading time of the OS.

20. The computer program product of claim 19 wherein the information is downloaded from a remote server via a communication network channel.

21. A computer data signal comprising:
a loading time code segment to determine loading time of an operating system (OS) in a computer system, the loading time code segment having:
a first time retrieval code segment for retrieving a first time from a real-time clock by a basic input and output system (BIOS) prior to loading the OS into memory of the computer system;
a loader code segment for loading the OS into memory of the computer system, the OS containing a device driver;
a second time retrieval code segment for retrieving a second time from the real-time clock by the device driver;
a time difference retrieval code segment for computing a time difference based on the first and second times to obtain the loading time of the OS; and
a duration determination segment for determining a duration of information to be displayed by said computer system based on said time difference.

22. The computer data signal of claim 21 further comprises:
a system identification code segment for recording an identification of the computer system;
a first time conversion code segment for converting the first time using a time format to a third time; and
a third time copy code segment for copying the third time into a time stamp structure.

23. The computer data signal of claim 22 further comprises:
a second time conversion code segment for converting the second time using the time format to a fourth time; and
a fourth time copy code segment for copying the fourth time into the time stamp structure.

24. The computer data signal of claim 23 further comprises:
a copy code segment for copying the identification and the time difference in to the time stamp structure; and
a save code segment for saving the time stamp structure in a storage area.

25. The computer data signal of claim 24 wherein the program code segment for loading the OS comprises:
a transfer code segment for transferring the OS from a storage device to the memory; and
a driver code segment for invoking the device driver from the OS.

26. The computer data signal of claim 25 wherein the second time retrieval code segment comprises:
a second time read code segment for executing the device driver to read the second time from the real-time clock.

27. The computer data signal of claim 23 wherein the time difference code segment comprises:
a subtract code segment for subtracting the third time from the fourth time to generate the time difference.

28. The computer data signal of claim 24 wherein the storage area is located in one of a local mass storage device and a remote server.

29. The computer data signal of claim 22 wherein the information is displayed during the loading time of the OS.

30. The computer data signal of claim 29 wherein the information is downloaded from a remote server via a communication network channel.

31. A system comprising:
a processor;
a display coupled to the processor;
a basic input and output system (BIOS) storage coupled to the processor to store a BIOS;
a real-time clock coupled to the processor; and
a memory coupled to the processor, the memory containing a program code to determine loading time of an operating system (OS), the program code when executed by the processor causing the processor to:
retrieve a first time from the real-time clock by the BIOS prior to loading the OS into an OS memory;
load the OS into the OS memory, the OS containing a device driver;
retrieve a second time from the real-time clock by the device driver;
compute a time difference based on the first and second times to obtain the loading time of the OS; and
determine a duration of information to be displayed on said display based on said time difference.

32. The system of claim 31 wherein the program code, when executed by the processor, further causing the processor to:
record an identification of the system;
convert the first time using a time format to a third time; and
copy the third time into a time stamp structure.

33. The system of claim 32 the program code, when executed by the processor, further causing the processor to:
convert the second time using the time format to a fourth time; and
copy the fourth time into the time stamp structure.

34. The system of claim 33 the program code, when executed by the processor, further causing the processor to:
copy the identification and the time difference into the time stamp structure; and
save the time stamp structure in a storage area.

35. The system of claim 34 wherein the program code, when causing the processor to load the OS, causing the processor to:
transfer the OS from a storage device to the OS memory; and
invoke the device driver from the OS.

36. The system of claim 35 wherein the program code, when causing the processor to retrieve the second time, causing the processor to:
execute the device driver to read the second time from the real-time clock.

37. The system of claim 33 wherein the program code, when causing the processor to compute the time difference, causing the processor to:
subtract the third time from the fourth time to generate the time difference.

38. The system of claim 34 wherein the storage area is located in one of a local mass storage device and a remote server.

39. The system of claim 32 wherein the information is displayed during the loading time of the OS.

40. The system of claim 39 wherein the information is downloaded from a remote server via a communication network channel.

* * * * *